M. J. McCAULEY.
FRUIT DRIER.
APPLICATION FILED SEPT. 5, 1917.

1,292,831. Patented Jan. 28, 1919.

M. J. McCauley
Inventor

By Geo. P. Kimmel
Attorney

UNITED STATES PATENT OFFICE.

MARY JANE McCAULEY, OF EDINA, MISSOURI.

FRUIT-DRIER.

1,292,831.　　　Specification of Letters Patent.　　Patented Jan. 28, 1919.

Application filed September 5, 1917. Serial No. 189,764.

*To all whom it may concern:*

Be it known that I, MARY JANE MCCAULEY, a citizen of the United States, residing at Edina, in the county of Knox and State of Missouri, have invented certain new and useful Improvements in Fruit-Driers, of which the following is a specification.

This invention relates to new and useful improvements in fruit driers, and the primary object of the invention is to provide a fruit holding cabinet, having wired screen walls, whereby the fruit when being dried will be protected from insects, and will allow a free circulation of air around the same.

Another object of the invention is to provide a fruit holding receptacle of this character that is provided with foldable supporting legs, whereby the receptacle may be easily transported, and occupy a very small amount of space during said transportation.

A further object of the invention is to provide a device of this character which is easily and simply constructed, inexpensive to manufacture, and one which will be very efficient in operation.

With these and numerous other objects in view, my invention consists of the novel features of construction, combination, and arrangement of parts which will be herein referred to and more particularly pointed out in the specification and claims.

In the accompanying drawings:—

In describing my invention I shall refer to the drawings in which similar reference characters designate corresponding parts throughout the several views.

Figure 1:
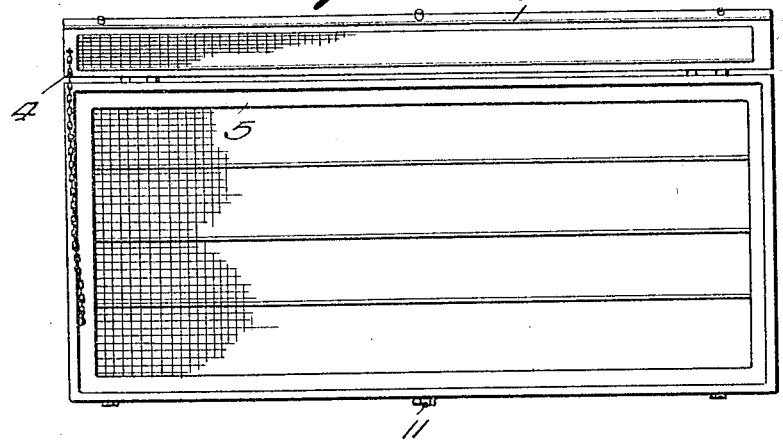
Figure 1 is a top plan view of the device with the top raised.

The receptacle in which the fruit is received, is substantially rectangular shape, having wire screen walls 1, and a substantially rectangular shaped screen top 2, which is hingedly connected with the rear wall as shown at 3, said top being adapted to be held in raised position, by a connecting chain 4, as clearly shown in Fig. 1 of the drawings. The edges of the screen that forms the walls of the receptacle, are formed of bent metal strips as shown at 4, that are connected, to insure a rigid structure.

Figure 2:
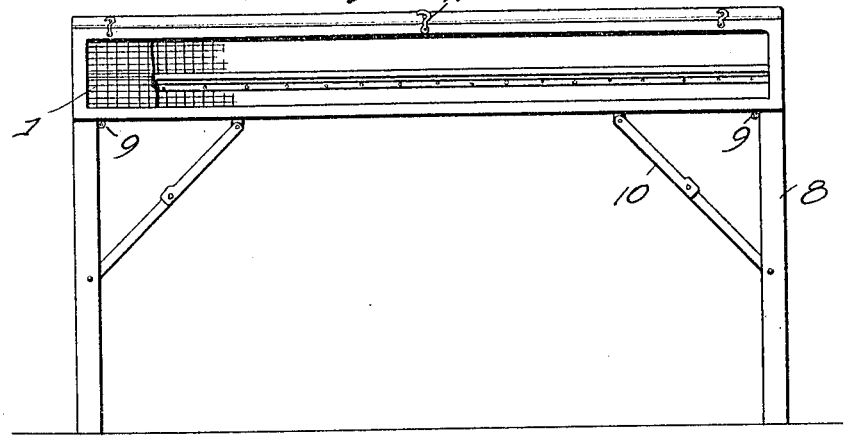
Fig. 2 is a side elevation of the same, showing the front side partly broken away.
Figure 3:
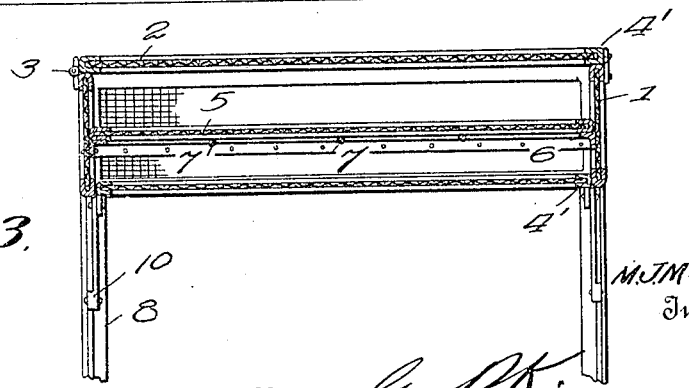
Fig. 3 is a transverse section.

The receptacle is provided with a horizontally extending wire screen partition 5 that is supported on longitudinally extending angle iron supporting brackets 6 secured to the side wall of the receptacle. This horizontally extending partition is supported, and the screen prevented from sagging, by longitudinally extending brace wire rods 7 that extend the length of the same, and which are clearly shown in Figs. 2 and 3 of the drawings. The horizontally extending partition is disposed adjacent the bottom of the receptacle, and hence a larger amount of fruit will be adapted to be positioned thereon, thus on the bottom of the receptacle, thereby rendering the reinforcing means employed necessary.

The receptacle is provided with supporting legs 8 that are formed of angle iron, disposed at the opposite corners thereof, and hingedly connected with the same as shown at 9. Hinged brace members 10 are employed, to support the legs in opposite, upright positions. By this means, when not in use, the legs 8 may be folded beneath the receptacle, so that the same may be easily transported from place to place. The cover 2 of the receptacle is provided with a latch means 11, to secure the same in position.

In operation, when the legs 8 are in position, the horizontally extending partition 5 is removed, after the cover has been lifted, and fruit is sorted over the bottom of the receptacle. Then the partition is placed on the supporting brackets 6, and fruit is placed upon the same. When the receptacle has been filled, the cover 2 is swung in operative position, and locked, and the fruit contained in the receptacle may be dried, the same being free from insects, but the wire screen walls of the receptacle allowing a free circulation of air therethrough. This type of fruit drier will be very strong, owing to the durable construction thereof, each of the metal edges of the screen walls being securely connected. The foldable legs are also formed of angle iron, and said legs when not in operative position, are adapted to fold beneath the receptacle so as the said receptacle will occupy very little space when stored or transported.

From the above description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:—

1. A fruit drier of the class described including a receptacle having wire screen walls, a hinged top for said receptacle, longitudinally extending angle iron supporting brackets secured to inner side walls of the receptacle, a horizontally extending wire screen partitioning frame positioned thereon, and longitudinally extending reinforcing wires extending the length of the frame.

2. A fruit drier of the class described including a substantially rectangular shaped receptacle, said receptacle having wire screen walls, a horizontally extending wire screen partition in said receptacle, reinforcing means for the central portion thereof, and supporting legs for said receptacle adapted to be folded beneath the same when not in operative position.

In testimony whereof I affix my signature hereto.

Miss MARY JANE McCAULEY.

Copies of this patent may be obtained for five cents each, by addressing the "Commissioner of Patents, Washington, D. C."